(12) United States Patent
Hasei

(10) Patent No.: US 7,572,483 B2
(45) Date of Patent: Aug. 11, 2009

(54) METHOD OF MANUFACTURING OPTICAL SHEET, OPTICAL SHEET, PLANAR LIGHTING APPARATUS, AND ELECTRO OPTICAL APPARATUS

(75) Inventor: Hironori Hasei, Okaya (JP)

(73) Assignee: Seiko Epson Corporation (JP)

( * ) Notice: Subject to any disclaimer, the term of this patent is extended or adjusted under 35 U.S.C. 154(b) by 201 days.

(21) Appl. No.: 11/420,312

(22) Filed: May 25, 2006

(65) Prior Publication Data

US 2006/0285360 A1 Dec. 21, 2006

(30) Foreign Application Priority Data

Jun. 20, 2005 (JP) .............................. 2005-178970

(51) Int. Cl.
*B05D 5/06* (2006.01)

(52) U.S. Cl. .................... 427/162; 264/1.32; 359/619; 359/620; 359/626; 362/627; 427/385.5; 438/29

(58) Field of Classification Search ................ 362/627; 264/1.32; 359/619, 620, 626; 427/162, 163.2, 427/226, 256, 279, 385.5, 389.7; 438/29
See application file for complete search history.

(56) References Cited

U.S. PATENT DOCUMENTS 5,707,684 A * 1/1998 Hayes et al. ................ 427/162

| | | | |
|---|---|---|---|
| 6,972,813 B1 | 12/2005 | Toyooka | |
| 2004/0106223 A1* | 6/2004 | Kaneko et al. ............... 438/29 |
| 2004/0257660 A1 | 12/2004 | Hasei | |
| 2005/0024558 A1 | 2/2005 | Toyooka | |
| 2005/0099823 A1 | 5/2005 | Choi et al. | |
| 2005/0133758 A1 | 6/2005 | Choi et al. | |

FOREIGN PATENT DOCUMENTS

| | | |
|---|---|---|
| CN | 1357091 | 7/2002 |
| CN | 1550319 | 12/2004 |
| CN | 1617026 | 5/2005 |
| JP | 06-198534 | 7/1994 |
| JP | 09-063731 | 3/1997 |
| JP | 10-321025 | 12/1998 |
| JP | 2003-279709 | 10/2003 |
| JP | 2004-157430 | 6/2004 |
| JP | 2005-095849 | 4/2005 |

* cited by examiner

*Primary Examiner*—Sandra L O'Shea
*Assistant Examiner*—Meghan K Dunwiddie
(74) *Attorney, Agent, or Firm*—Harness, Dickey & Pierce, P.L.C.

(57) ABSTRACT

A method of manufacturing an optical sheet includes: discharging a liquid droplet discharged to one side surface of a sheet substrate; and curing the liquid droplet so that a protrusion is formed in the one side surface to allow light from the one side surface to be refracted and emitted, wherein a supporting substrate that supports the sheet substrate is adhered to another side surface of the sheet substrate before the liquid droplet is discharged.

10 Claims, 4 Drawing Sheets

METHOD OF MANUFACTURING OPTICAL SHEET, OPTICAL SHEET, PLANAR LIGHTING APPARATUS, AND ELECTRO OPTICAL APPARATUS

BACKGROUND OF THE INVENTION

1. Technical Field

The present invention relates to a method of manufacturing an optical sheet, an optical sheet, a planar lighting apparatus, and an electro optical apparatus.

2. Related Art

Conventionally, a liquid crystal display apparatus is provided with a backlight which serves as a planar lighting apparatus that emits light in a planar manner. Such a backlight generally has a diffuser sheet as an optical sheet that diffuses light from a light source such as an LED over the entire back surface of the liquid crystal panel so as to suppress unevenness in brightness of the light for illuminating.

As a method of manufacturing such the diffuser sheet, there is known an applying method in which resin containing diffusing fine particles (for example, metallic fine particles or resin beads) are applied to one side surface of a sheet substrate, and the resin film thus applied is then cured. However, the above applying method has a difficulty in controlling the density distribution of the diffusing fine particles, that is, optical properties of the diffuser sheet (for example, intensity distribution or diffuser efficiency of the light diffused).

In view of the above, for the above method of manufacturing a diffuser sheet, there has already been made a propose to enhance the optical properties of the diffuser sheet (see, for example, JP-A-2004-157430). According to JP-A-2004-157430, there is proposed an ink jet method in which resin liquid droplets are discharged to one side surface of a sheet substrate, and the liquid droplets thus discharged are then dried and cured, thereby forming dots as protrusions having light diffusion properties. Further, dot forming position, dot size, and dot density distribution can be controlled depending on the volume of liquid droplets or the position at which liquid droplets are discharged, thereby making it possible for the one side surface of the sheet substrate to have predetermined optical properties.

However, in the above-mentioned diffuser sheet, its sheet substrate is made to have a thickness of between several tens of μm and several hundreds of μm so as to suppress the degradation of brightness of the liquid crystal apparatus (backlight). Moreover, according to the above-mentioned ink jet method, such the thin sheet substrates are sequentially moved and conveyed to the position where the liquid droplets are discharged.

As a result, in the ink jet method, when, for example, upon the movement and conveyance of the sheet substrate, an external stress, vibration or the like is applied to the sheet member of the sheet substrate, there occur positional deviation or mechanical deformation (flexure, distortion or the like) of the sheet substrate, thereby deteriorating the position accuracy of the depositing position of the liquid droplets. By extension, there was a problem in that the positional deviation of the dot forming position, variation in dot size or the like may occur, resulting in variation of the optical properties of each diffuser sheet.

SUMMARY

An advantage of the present invention is to provide a method of manufacturing an optical sheet with reduced variation in optical properties, an optical sheet, a planar lighting apparatus, and an electro optical apparatus.

According to one aspect of the invention, a method of manufacturing an optical sheet includes: discharging a liquid droplet to one side surface of a sheet substrate; and curing the liquid droplet so that a protrusion is formed in the one side surface to allow light from the one side surface to be refracted and emitted, wherein a supporting substrate that carries the sheet substrate is adhered to another side surface of the sheet substrate before the liquid droplet is discharged.

In the above mentioned method of the invention, it is possible to increase the weight of the sheet substrate at the time of discharging the liquid droplets so much the more as the supporting substrate is adhered to the sheet substrate, thereby making it possible to enhance the mechanical strength thereof. Therefore, it is possible to suppress the positional deviation or mechanical deformation (distortion, flexure or the like). As a result, it is possible to discharge the liquid droplets to a desired position on the one side surface, thereby making it possible to suppress the positional deviation, the variation in shape or the like of the protrusions to be formed on the sheet substrate. Thus, it is possible to suppress variation in optical properties (for example, such as diffusion and concentration of the light or the like) in a step of manufacturing an optical sheet.

In the above mentioned method, the another side surface of the sheet substrate may be opposed to the one side surface.

According to the above mentioned method, it is possible to suppress the positional deviation, mechanical deformation or the like more reliably because the supporting substrate is adhered to the another side surface opposed to the one side surface.

In the above mentioned method, the supporting substrate may be a light guide plate that allows light from a light source to be guided from an emission surface of the supporting substrate toward the another side surface of the sheet substrate opposed to the one side surface, and the emission surface of the light guide plate may be adhered to the another side surface of the sheet substrate before the liquid droplet is discharged.

According to the above mentioned method, it is possible to manufacture the optical sheet having the light guide plate without removing the sheet substrate from the supporting substrate. As a result, the positional alignment between the optical sheet and the light guide plate can be enhanced, thereby making it possible to further suppress the variation in optical properties of the optical sheet.

In the above mentioned method, liquid repellency may be applied to the one side surface so as to repel the liquid droplet before the liquid droplet is discharged.

According to the above mentioned method, it is possible to enhance the controllability of the shape of the liquid droplets deposited on the one side surface so much the more as liquid repellency is applied to the one side surface, thereby making it possible to further suppress the variation in optical properties.

In the above mentioned method, the protrusion may be different in refractive index from the sheet substrate.

According to the above mentioned method, regardless of the shape of the protrusions, it is possible to refract the light from the one side surface just at the one side surface, thereby making it possible to suppress the positional deviation of the protrusions.

In the above mentioned method, the protrusion may be a micro lens that allows the light from the one side surface to be diffused.

According to the above mentioned method, it is possible to suppress the positional deviation of the forming position or the variation in shape of the micro lens allowing the light from the one side surface to be diffused, thereby making it possible to suppress the variation in optical properties of the optical sheet provided with the micro lens.

In the above mentioned method, the sheet substrate may include a diffusing fine particle that allows the light entering from the another side surface side of the sheet substrate to be diffused on the one side surface side.

According to the above mentioned method, it is possible to diffuse the light from the another side surface of the optical sheet by the diffusing fine particle and to suppress the variation in optical properties of the optical sheet.

According to a second aspect of the present invention, an optical sheet is manufactured according to the above mentioned method.

In this case, it is possible to suppress the variation in optical properties of the above mentioned optical sheet.

According to a third aspect of the present invention, an optical sheet includes: a protrusion formed by curing a liquid droplet discharged to one side surface of a sheet substrate to refract and emit light from the one side surface; and a supporting substrate adhered to another side surface of the sheet substrate and supporting the sheet substrate.

In the above mentioned optical sheet, it is possible to enhance the mechanical strength of the sheet substrate so much the more as the supporting substrate is adhered to the sheet substrate. Therefore, it is possible to suppress the mechanical strength of the sheet substrate (distortion, flexure or the like), thereby making it possible to avoid the breakage of the protrusions due to the mechanical deformation of the sheet substrate. By extension, it is also possible to suppress the variation in optical properties of the optical sheet.

In the above mentioned optical sheet, the sheet substrate may be a light guide plate that allows light introduced from a light source to be guided to the sheet substrate.

According to the above mentioned optical sheet, there can be provided the optical sheet provided with the light guide plate, making it possible to suppress the variation in optical properties of the optical sheet.

According to a fourth aspect of the present invention, a planar lighting apparatus includes: a light source; and an optical sheet that refracts and emits light introduced from the light source, wherein the optical sheet is the above mentioned optical sheet.

In the planar lighting apparatus, it is possible to suppress the variation in optical properties of the planar lighting apparatus, thereby making it possible to brightness or evenness of light from the planar lighting apparatus.

According to a fifth aspect of the present invention, an electro optical apparatus modulates and emits light from a planar lighting apparatus, wherein the planar lighting apparatus is the above mentioned planar lighting apparatus.

In the above mentioned electro optical apparatus, it is possible to provide the electro optical apparatus with enhanced brightness or evenness of light from the planar lighting apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
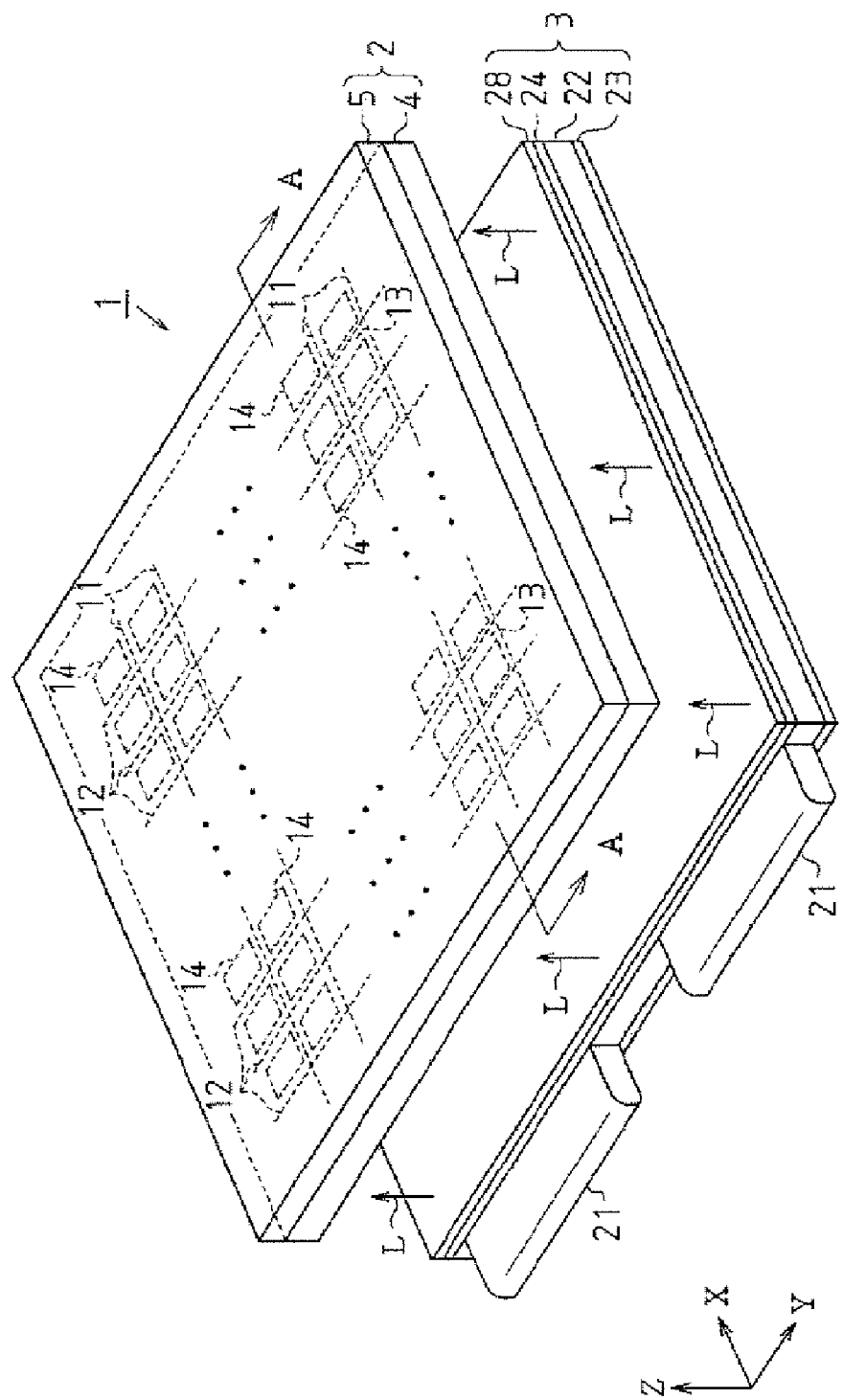
FIG. 1 is a schematic perspective view showing a liquid crystal display apparatus according to an embodiment of the present invention.

In the following, an embodiment of the invention will be described with reference to FIGS. 1 to 7. First, a liquid crystal display apparatus as an electro optical apparatus according to the invention will be described. FIG. 1 is a schematic perspective view showing the liquid crystal display apparatus, and FIG. 2 is a cross sectional view taken along the line A-A of FIG. 1.

In FIG. 1, the liquid crystal display apparatus 1 includes a liquid crystal panel 2 and a backlight 3 as a planar lighting apparatus.

The liquid crystal panel 2 is formed by adhering, via a sealing material 6 (see FIG. 2), a glass substrate (opposite substrate 4), which has a rectangular plate shape and provided on the backlight 3 side, and a glass substrate (element substrate 5), which is opposed to the opposite substrate 4. Between a gap of the opposite substrate 4 and the element substrate 5, there is filled a liquid crystal 7 (see, FIG. 2).

Figure 2:
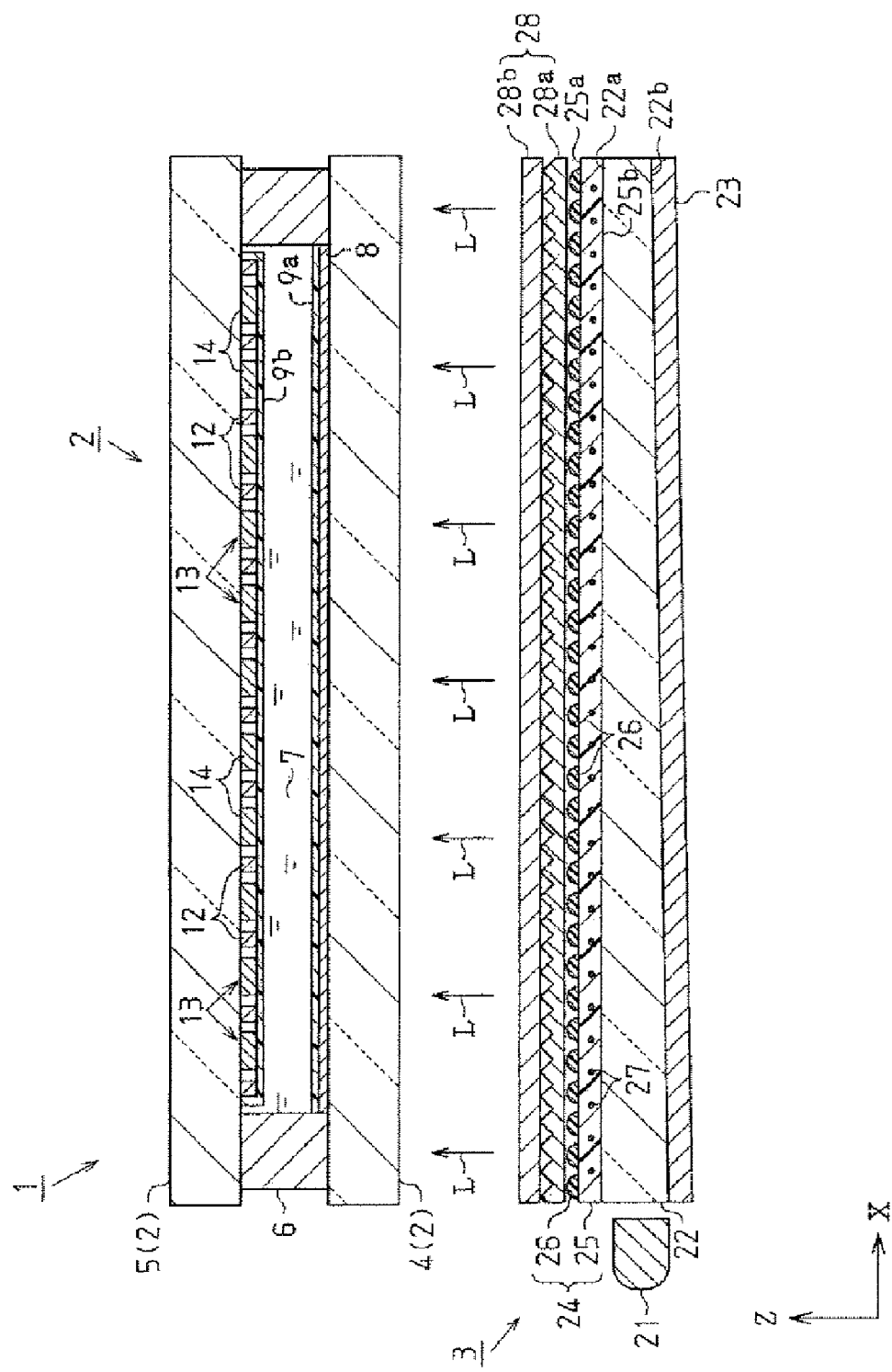
FIG. 2 is a schematic plan view for illustrating a micro lens according to the embodiment of the present invention.

As shown in FIG. 2, on the side surface on the element substrate 5 side (upper side) of the opposite substrate 4, there is laminated an opposite electrode 8 composed of a transparent conductive film, thereby allowing a predetermined common electric potential from a power circuit (not shown) to be supplied. On the upper side of the opposite electrode 8, there is laminated an alignment film 9a to which an alignment treatment is performed, thereby allowing the alignment of the liquid crystal 7 to be set in a predetermined alignment in the vicinity of the opposite electrode 8.

As shown in FIG. 1, on the side surface on the opposite substrate 4 side (underside) of the element substrate 5, there are formed a plurality of scanning lines 11 extending in one direction (X arrow direction), thereby allowing scanning signals from a scanning line driving circuit (not shown) to be output at a predetermined timing. In a direction orthogonal to the scanning lines 11 (Y arrow direction), there are formed a plurality of data lines 12, thereby allowing data signals based on display data from data line driving circuit (not shown) to be input at a predetermined timing.

At positions at which the respective scanning lines 11 and the respective data lines 12 intersect with each other, there are formed a plurality of pixel regions 13, which are respectively connected to the corresponding scanning lines 11 and the corresponding data lines 12 and aligned in a matrix manner. In each of the pixel regions 13, there are formed a control element (not shown) such as TFT and a pixel electrode 14 composed of a transparent conductive film. On the underside of the data lines 12 (scanning lines 11) and the pixel electrodes 14, as shown in FIG. 2, there is laminated an alignment film 9b to which an alignment treatment is performed, thereby allowing the liquid crystal 7 to be set in a predetermined alignment in the vicinity of the respective pixel electrodes 14.

Note that in this embodiment a direction which is normal to the opposite substrate 4 and extends upwardly therefrom is referred to as Z arrow direction.

When the scanning lines 11 are sequentially selected on the basis of the line-order scanning, the control elements in the pixel regions 13 are sequentially turned on only during the period of selection, and the data signals are output to the corresponding pixel electrodes 14 via the corresponding data lines 12 and the corresponding control elements. Then, depending on the potential difference between the pixel electrodes 14 and the opposite electrodes 8, the alignment state of the liquid crystal 7 is maintained so as to modulate the illumination light L from a backlight 3 (described later). A desired image is displayed on the liquid crystal panel 2 depending on whether the modulated illumination light L passes through a polarization plate (not shown) or not.

Note that the liquid crystal display apparatus 1 of this embodiment is a so-called active matrix type liquid crystal display apparatus provided with a TFT or the like in the pixel regions 13. However, the liquid crystal display apparatus 1 of this embodiment may be, for example, a passive matrix type liquid crystal display apparatus. Further, the liquid crystal display apparatus 1 of this embodiment is constructed such that the opposite substrate 4 is arranged on the backlight 3 side. However, it should not be construed restrictively. For example, it is also possible to provide the element substrate 5 on the backlight 3 side.

As shown in FIG. 2, the backlight 3 has on its side in the direction opposed to the X arrow direction a light source 21 such as an LED. Light emitted from the light source 21 is emitted via a reflector or the like (not shown) toward a light guide plate 22 which seives as a supporting substrate provided so as to extend in the X arrow direction. In other words, the backlight 3 is an edge light type backlight.

The light guide plate 22 is an optically transparent plate member, which is formed to be substantially rectangular-shape when viewed from the Z arrow direction and which is composed of a transparent resin material such as acrylic resin, polycarbonate or polyester, or an inorganic transparent material such as a glass or quartz. The thickness of the light guide plate 22 in the Z arrow direction is formed so as to be thinner in the direction away from the light source 21 (X arrow direction). To be more specific, the light guide plate 22 has its upper surface (emission surface 22a) formed to be perpendicular to the Z arrow direction and its lower surface (reflection surface 22b) formed to be inclined with respect to the Z arrow direction toward the direction away from the light source 21 (X arrow direction).

The average thickness of the light guide plate 22 according to this embodiment (average value of the width in the Z arrow direction) is formed to be about 1 mm in order to achieve the above mentioned optical properties. However, it should not be construed restrictively.

On the reflection plate 22b of the light guide plate 22 according to this embodiment, there are provided a number of reflective dots and reflective grooves or the like (not shown) so that light emitted from the emission surface 22a has a uniform brightness distribution. Under the reflection surface 22b, there is provided a reflective sheet 23 composed of light reflective aluminum or the like.

Then, when light beams from the light source 21 are emitted to the light guide plate 22, the light beams are refracted and reflected by the emission surface 22a and reflection surface 22b to thereby propagate inside the light guide plate 22. The light beams leaking out from the reflection surface 22b are reflected to the emission surface 22a side by the reflective sheet 23. When the light beams exceed a critical angle with respect to the emission surface 22a, then they are sequentially emitted from the emission surface 22a.

Therefore, of light beams from the light source 21, light beams traveling substantially in the Z arrow direction (or substantially in the direction opposed thereto) are emitted from the light source 21 side of the emission surface 22a (or from the side opposed to the X arrow direction), while light beams from the light source 21 traveling substantially in the X arrow direction are emitted from the side of the X arrow direction of the emission surface 22a due to the reflection by the reflection surface 22b. In other words, light beams from the light source 21 are emitted from the entire emission surface 22a.

A diffuser sheet 24 as an optical sheet is adhered to the emission surface 22a of the light guide plate 22. The diffuser sheet 24 has a sheet substrate 25, which is formed to have a rectangular shape and substantially the same size as that of the light guide plate 22, and a plurality of micro lenses 26 as protrusions formed in the upper surface (discharge surface) 25a of the sheet plate 25.

The sheet substrate 25 is an optically transparent sheet member whose lower surface (adhesion surface 25b) is adhered to the emission surface 22a of the light guide plate 22. The sheet substrate 25 is formed of, for example, optically transparent resin such as acryl resin, polyester resin, urethane resin, epoxy resin, polycarbonate resin, styrene resin, or novolac resin, and has a refractive index which is different from that of the light guide plate 22 and that of atmosphere.

The thickness of the sheet substrate 25 according to this embodiment (width in the Z arrow direction) is formed to be about 1.00 μm so as to avoid a heat deformation (flexure, curling or the like) due to light from the light source 21 to thereby suppress the degradation in brightness of the liquid crystal display apparatus 1; however, it should not be construed restrictively.

Diffusing fine particles 27 are contained inside the sheet substrate 25 to be uniformly distributed all over the sheet substrate 25. The diffusing fine particles 27 are different in a refractive index from the above mentioned optically transparent resin, and particle size thereof is formed to be, for example, between 200 nm and 500 nm. The diffusing fine particles 27 may be fine particles composed of, for example, silica, alumina, titania, calcium carbonate, aluminum hydroxide, acrylic resin, organic silicone resin, polystyrene, urea resin, and formaldehyde condensate, or may be mixtures of the above.

On the discharge surface 25a of the sheet substrate 25, there is formed a liquid repellent layer 25c (see FIG. 7) to which liquid repellency is applied by a liquid repellency applying step (described later) so as to be repellent against liquid droplets D (see FIG. 6) of a lens forming material F (described later), that is, so as to include a liquid repellent group.

When light from the light guide plate 22 (emission surface 22a) is emitted to the sheet substrate 25, the light from the light guide plate 22 is refracted by the adhesion surface 25b and then diffused in the sheet substrate 25. The light thus diffused in the sheet substrate 25 is further diffused due to the diffusing fine particles 27, and then guided to the discharge surface 25a side of the sheet substrate 25.

Figure 3:
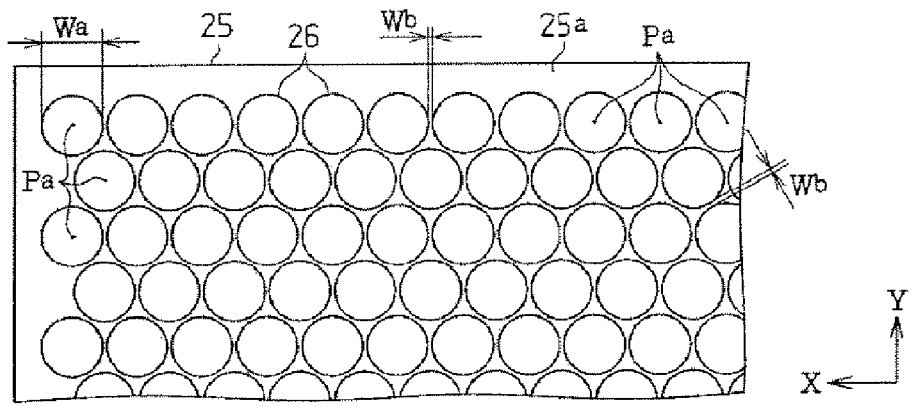
FIG. 3 is an explanatory view for illustrating a step of manufacturing a diffuser sheet according to the embodiment of the present invention.

The micro lenses 26 are hemispheric convex lenses formed uniformly over the entire discharge surface 25a, and are adopted to refract and diffuse the light from the discharge surface 25a. To be more specific, as shown in FIG. 3, the micro lenses 26 are formed in a close-packed manner in a equilateral triangle grid pattern over the entire discharge surface 25a so that the outer diameter (lens diameter Wa) of the micro lenses 26 is made to be about 50 μm and the distance between the adjacent micro lenses 26 (interdistance Wb) is made to be about 3.5 μm. Each micro lens 26 has a refractive index different from that of the sheet substrate 25, and has a lens coefficient so that the maximum intensity direction of the diffused light is made to be optimum with respect to a prism sheet 28 (described later).

In this embodiment, the center position of each of the micro lenses 26 is referred to as a target discharge position Pa.

The micro lenses 26 are formed by, during a liquid droplet discharging step and a lens forming step (described later), discharging the liquid droplets D (see FIG. 6) of the lens forming material F (described later) onto the discharge surface 25a of the sheet substrate 25 and then curing the liquid droplets D thus discharged.

Further, when light from the discharge surface 25a is emitted to each of the micro lenses 26, the light entering each of the micro lenses 26 is refracted by each of the micro lenses 26 to be further diffused (uniformly diffused), thereby diffusing bright points, bright lines, unevenness in brightness or the like caused by, for example, the reflection of the reflection surface 22b. Then, the maximum intensity direction of the light thus uniformly diffused is guided so as to be optimum with respect to the prism sheet 28 (described later).

As shown in FIG. 2, on the upper side of the diffuser sheet 24, there is provided the prism sheet 28. The prism sheet 28 is a sheet obtained by overlapping a first prism sheet 28a having fine linear prism arranged in an array manner along the X arrow direction and a second prism sheet 28b having fine linear prism arranged in an array manner along the Y arrow direction. The prism sheet 28 guides the maximum intensity direction of the light from the diffuser sheet 24 in the Z arrow direction due to the refraction of the first prism sheet 28a and the second prism sheet 28b.

Further, when the light from the diffuser sheet 24 is emitted to the prism sheet 28, the light entering the prism sheet 28 changes its maximum intensity direction into the Z arrow direction through refraction by the prism sheet 28, thereby illuminating the liquid crystal panel 2.

In this case, illumination light L illuminating the liquid crystal panel 2 has enhanced evenness in its brightness so much the more as the micro lenses 26 each having a uniform shape are formed in a close-packed manner on the discharge surface 25a. Further, the illumination light L illuminating the liquid crystal panel 2 is to have enhanced evenness in its brightness so much the more as the light from the diffuser sheet 24 (micro lenses 26) is guided in an optimum direction with respect to the prism sheet 28. Thus, the liquid crystal display apparatus 1 has an enhanced display quality due to the enhanced brightness of the illumination light L from backlight 3 and the enhanced evenness thereof.

Note that the prism sheet 28 allows the light from the diffuser sheet 24 to be refracted to the liquid crystal panel 2 side, thereby enhancing the brightness of the light illuminating the liquid crystal panel 2, a construction in which the prism sheet 28 is omitted is also possible if enough brightness can be obtained solely by the diffuser sheet 24.

Next, the method of manufacturing the above diffuser sheet 24 will be described. FIGS. 4 to 7 are each an explanatory diagram for illustrating the method of manufacturing the diffuser sheet 24.

First, a step in which the sheet substrate 25 is adhered to the light guide plate 22 is performed.

Figure 4:
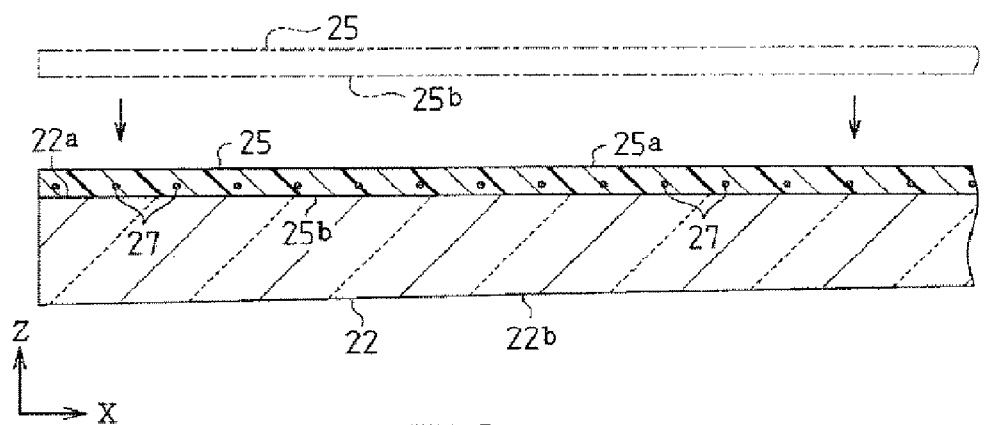
FIG. 4 is an explanatory view for illustrating a step of manufacturing a diffuser sheet according to the embodiment of the present invention.

In other words, as shown in FIG. 4, a predetermined adhesive is applied on the emission surface 22a of the light guide plate 22, and the adhesion surface 25b of the sheet substrate 25 is then adhered to the emission surface 22a of the light guide plate 22. By this, the discharge surface 25a of the sheet substrate 25 is positioned and fixed along the emission surface 22a of the light guide plate 22, thereby enhancing the mechanical strength of the discharge surface 25a of the sheet guiding plate 22.

After the sheet substrate 25 has been adhered to the light guide plate 22, a liquid repellency applying step in which liquid repellency is applied to the sheet substrate 25 (light guide plate 22).

Figure 5:
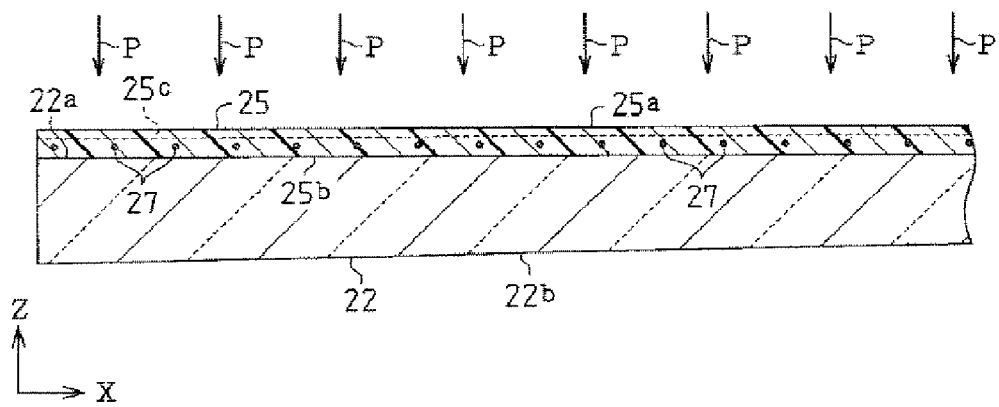
FIG. 5 is an explanatory view for illustrating a step of manufacturing a diffuser sheet according to the embodiment of the present invention.

In other words, as shown in FIG. 5, the sheet substrate 25 which is adhered to the light guide plate 22 is conveyed into a known plasma apparatus. Then, the entire discharge surface 25a of the sheet substrate 25 is exposed to fluorine plasma P (for example, perfluorocarbon/chlorine plasma), thereby forming the liquid repellent layer 25c including a fluoro group or a fluorocarbon group over the entire discharge surface 25a.

After the liquid repellent layer 25c is formed on the discharge surface 25a, the sheet substrate 25 and the light guide plate 22 adhered to each other are conveyed to a liquid droplet discharge apparatus 30, and a liquid droplet discharging step in which the liquid droplets D are discharged to the discharge surface 25a is performed. First, the construction of the liquid droplet discharge apparatus 30 that discharges the liquid droplets D will be described.

Figure 6:
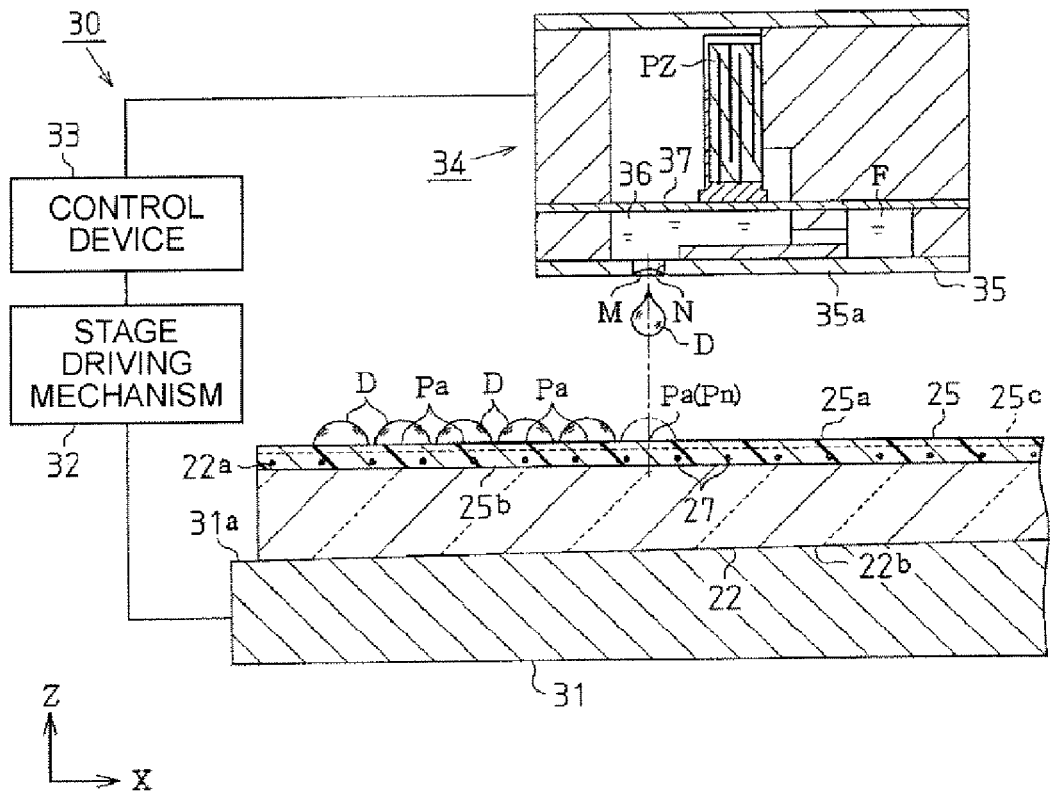
FIG. 6 is an explanatory view for illustrating a step of manufacturing a diffuser sheet according to the embodiment of the present invention.

As shown in FIG. 6, the liquid droplet discharge apparatus 30 is provided with a substrate stage 31. The substrate stage 31 is formed such that the sheet substrate 25 adhered to the light guide plate 22 is mounted and fixed in a predetermined position on the upper side (mounting surface 31a) of the substrate stage 31, with the discharge surface 25a facing upward. A stage driving mechanism 32 is connected to the substrate stage 31.

The stage driving mechanism 32 is, for example, a screw type linear motion mechanism provided with a screw shaft extending in the X axis direction and a ball nut into which the screw shaft is threaded, and adapted to be driven in a controlled manner by a control device 33 so as to convey the substrate stage 31 (sheet substrate 25) in the X arrow direction and in the direction opposed to the X arrow direction.

When the stage driving mechanism 32 receives a driving signal from the control device 33, the substrate stage 31 moves the position of the mounting surface 31a facing the respective target discharge positions Pa so as to be positioned directly under a discharge nozzle N (described later).

On the upper side of the discharge surface 25a, there is provided a liquid droplet discharge head (hereinafter, merely referred to as a discharge head) 34. The discharge head 34 is provided with, on its lower side, a nozzle plate 35. On the lower surface of the nozzle plate 35 (nozzle forming surface 35a), there are arranged, in the Y arrow direction (in the direction perpendicular to the sheet of FIG. 6), a plurality of discharge nozzles (hereinafter, merely referred to as nozzles) N formed so as to extend in the Z arrow direction.

In this embodiment, a position on the discharge surface 25a which faces the respective nozzle N is referred to as a depositing position Pn.

A cavity 36 communicating with the liquid tank (not shown) is formed in the Z arrow direction viewed from each of the nozzle N so that the lens forming material F derived from the liquid tank to be introduced into the cavity 36. Then, each cavity 36 supplies the lens forming material F thus introduced to the corresponding nozzle N.

A vibrating plate 37 which is adhered so as to vibrate between the Z arrow direction and the direction opposed to the Z arrow direction is provided in the Z arrow direction viewed from the cavity 36, thereby allowing the volume in the cavity 36 to be increased and decreased. A piezoelectric element PZ corresponding to each of the nozzles N is provided in the Z arrow direction viewed from the vibrating plate 37. The piezoelectric element PZ contracts and expands upon receiving a driving signal from the control device 33, and vibrates the vibrating plate 37 between the Z arrow direction and the direction opposed to the Z arrow direction, thereby pressurizing and depressurize the inside of the cavity 36.

The lens forming material F according to this embodiment is a solvent-free material containing no organic solvent, and is, for example, ultraviolet curable resin such as ultraviolet curable acrylic resin or ultraviolet curable epoxy resin. To be more specific, the ultraviolet curable resin in this regard includes: at least one of prepolymers, oligomers and monomers; and photo polymerization initiators.

Examples of the polymers or the oligomers in this regard can include: acrylates such as epoxy acrylates, urethane acrylates, polyester acrylates, polyether acrylates, spiroacetal acrylates; and methacrylates such as epoxy methacrylates, urethane methacrylates, polyether methacrylates, polyether methacrylates.

Further, examples of the monomers in this regard can include: monofunctional monomers such as 2-ethylhexyl acrylate, 2-ethylhexyl methacrylate, 2-hydroxyethyl acrylate, 2-hydroxyethyl methacrylate, N-vinyl-2-pyrrolidone, carbitol acrylate, tetrahydrofurfuryl acrylate, isobonyl acrylate, dicyclopentenyl acrylate, 1,3-butanediol acrylate; and polyfunctionalized monomers such as 1,6-hexanediol diacrylate, 1,6-hexanediol metacrylate, neopentyl glycol acrylate, polyethylene glycol diacrylate, trimethylolpropane trimethacrylate, pentaerythritol triacrylate, dipentaerithritol hexacrylate.

Further, examples of polymerization initiators include radical generating compounds such as: acetophenones such as 2,2-dimethoxy-2-phenylacetophenone; butylphenones such as α-hydroxyisobutylphenone and p-isopropyl-α-hydroxyisobutylphenone; haloganated acetophenones such as p-tert-butyldichloroacetophenone, p-tert-butyltrichloroacetophenone, and α,α-dichloro-4-phenoxyacetophenone; benzophenones such as benzophenone and N,N-tetraethyl-4,4-diaminobenzophenone; benzyls such as benzyl, and benzyldimethylketal; benzoins such as benzoin and benzoin alkyl ether; oximes such as 1-phenyl-1,2-propandione-2-(o-ethoxycarbonyl)oxime; xanthones such as 2-methylthioxanthone and 2-chlorothioxanthone; and Michler's ketones.

When the discharge head 34 receives a driving signal from the control device 33, the corresponding cavity 36 is depressurized and pressurized, thereby vibrating the interface of the lens forming material F in the corresponding nozzle N (meniscus M) between the Z arrow direction and the direction opposed to the Z arrow direction. By thus vibrating the meniscus M of the lens forming material F, a predetermined amount of the lens forming material F corresponding to the expansion width of the piezoelectric element PZ is discharged as liquid droplets D from the corresponding nozzle N. The liquid droplets D thus discharged fly in the direction opposed to the Z arrow direction of the corresponding nozzle N and deposited on the depositing position Pn.

In this case, the sheet substrate 25 (discharge surface 25a) mounted on the substrate stage 31 has an increased weight due to the light guide plate 22 adhered thereto, and thus an enhanced mechanical strength. Therefore, the sheet substrate 25 (discharge surface 25a) maintains its relative position with respect to the substrate stage 31 without being involved with positional deviation or mechanical deformation distortion, flexure or the like).

Therefore, the discharge surface 25a of the sheet substrate 25 allows the predetermined target discharge positions Pa to be sequentially positioned at the depositing position Pn by conveying and moving the substrate stage 31 without positional deviation or the like. Then, a predetermined amount of the lens forming material F discharged from the discharge head as liquid droplet D is deposited on each of the target discharge positions Pa positioned at the depositing position Pn. The liquid droplet D thus deposited on each of the target discharge positions Pa is repelled by the liquid repellent layer 25c, thereby achieving a predetermined shape (hemispheric shape in this embodiment).

Then, when the liquid droplet discharging step is completed, the liquid droplet D on each of the target discharge positions Pa is cured, and the lens forming step in which the micro lenses 26 are formed is then performed.

Figure 7:
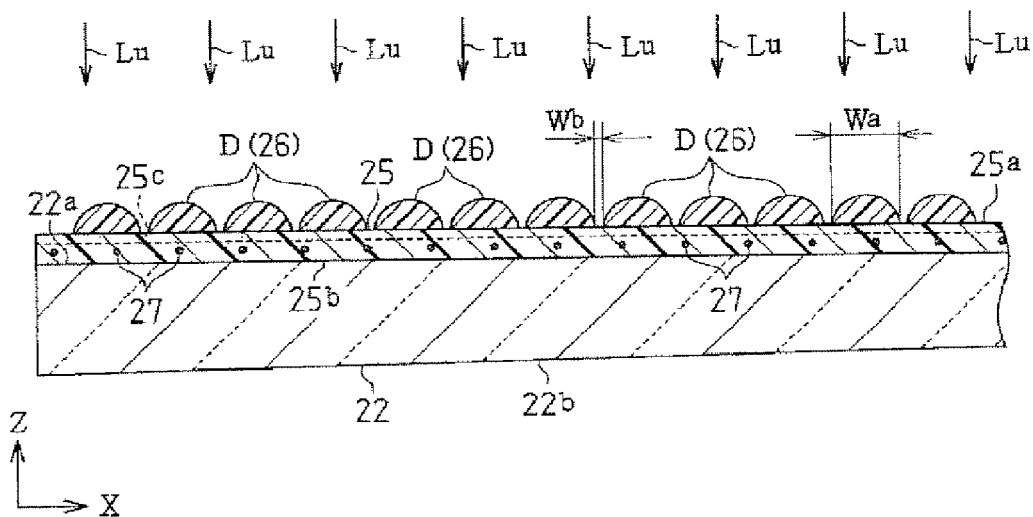
FIG. 7 is an explanatory view for illustrating a step of manufacturing a diffuser sheet according to the embodiment of the present invention.

In other words, as shown in FIG. 7, the liquid droplet D at each of the target discharge positions Pa is irradiated with ultraviolet rays Lu, and then cured to be fixed to the discharge surface 25a. As a result, at each of the target discharge positions Pa of the discharge surface 25a, there is formed the hemispheric micro lens 26 whose outer diameter is called the lens diameter Wa and the distance from which to the adjacent micro lens 26 is called the interdistance Wb.

Next, effects of this embodiment as constructed above will be described.

1. According to the above embodiment, the sheet substrate 25 is first adhered to the light guide plate 22 before the liquid droplet D of the lens forming material F is discharged to the sheet substrate 25.

As a result, it becomes possible to eliminate positional deviation or mechanical deformation of the sheet substrate 25, thereby making it possible to form the micro lenses 26 of a predetermined shape at the predetermined target discharge position Pa. Therefore, the micro lenses 26 of a uniform shape can be formed in a close-packed manner over the entire discharge surface 25a, thereby making it possible to enhance the brightness of the illumination light L emitted from the backlight 3 and the evenness thereof. In other words, it is possible to reduce the unevenness in the optical properties of the diffuser sheet 24.

2. Moreover, the sheet substrate 25 (adhesion surface 22b) is adhered to the emission surface 22a of the light guide plate 22. Therefore, it is possible to manufacture the diffuser sheet having the light guide plate 22 in the manufacturing step of the diffuser sheet 24 without removing the sheet substrate 25 with the micro lenses 26 formed therein from the supporting substrate (light guide plate 22). As a result, the positional alignment between the diffuser sheet 24 and the light guide plate 22 can be enhanced, thereby further reducing the unevenness in the optical properties of the diffuser sheet 24.

3. According to the above embodiment, the liquid repellency applying step is performed before the liquid droplets D are discharged, and the liquid repellent layer 25c is formed on the discharge surface 25a of the sheet substrate 25. Therefore, it is possible to control the liquid droplets D discharged so as to prevent the liquid droplets D from spreading to making the discharge surface 25a wet, thereby making it possible to reliably form the micro lenses 26 of the predetermined shape.

4. According to the above embodiment, the micro lenses 26 are formed by a material which is different in refractive index from the sheet substrate 25. Therefore, it is possible to enhance the diffuser efficiency of the diffuser sheet 24.

5. According to the above embodiment, the diffusing fine particles 27 are included in the sheet substrate 25. Therefore, the light emitted from the light guide plate 22 can be further diffused, thereby making it possible to further enhance the evenness in the brightness of the illumination light L emitted from the backlight 3.

Note that the above embodiment may be changed as follows.

In the above embodiment, the supporting substrate is embodied as the light guide plate 22. However, it should not be construed restrictively. For example, the supporting substrate may be one which is obtained by adhering the reflective sheet 23 to the reflection surface 22b of the light guide plate 22. Alternatively, a substrate capable of supporting the sheet substrate 25 while eliminating positional deviation or mechanical deformation of the sheet substrate 25 may be separately used as the supporting substrate. In this case, preferably, the micro lenses 26 are formed on the discharge surface 25a of the sheet substrate 25 adhered to the supporting substrate, the sheet substrate 25 is then removed from the supporting substrate, and the sheet substrate 25 thus removed is separately provided on the emission surface 22a of the light guide plate 22.

In the above embodiment, the sheet substrate 25 is adhered to the emission surface 22a and supports the light guide plate 22. However, it should not be construed restrictively. For example, it is possible to adhere a supporting substrate formed in a frame shape at the outer edge portion of the sheet substrate 25. It is sufficient to perform the adhesion of the sheet substrate 25 while making it possible to suppress positional deviation or mechanical deformation.

In the above embodiment, the liquid repellent layer 25c is formed on the discharge surface 25a of the sheet substrate 25. However, it should not be construed restrictively. For example, it is also possible to form the sheet substrate 25 by a liquid repellent material which repels the liquid droplets D. Alternatively, the discharge surface 25a may be non-liquid repellent if the shape of the liquid droplets D deposited on the discharge surface 25a can be sufficiently controlled.

In the above embodiment, the protrusions are embodied as the hemispheric micro lenses 26. However, it should not be construed restrictively. For example, the protrusions may be embodied as concave lenses or lenticular lenses. Alternatively, the protrusions may be embodied as rectangular protrusions. In other words, it is sufficient for the protrusions to be able to allow the light from the sheet substrate 25 to be refracted and to control the optical properties of the optical substrate.

In the above embodiment, the uniformly shaped micro lenses 26 are formed in a close-packed manner over the entire discharge surface 25a. However, it should not be construed restrictively. For example, it is also possible to form the micro lenses 26 in a close-packed manner in the regions where the brightness of the light emitted from the light guide plate 22 while a small number of the micro lenses 26 are formed in the regions where the brightness is low. In other words, preferably, the micro lenses 26 are changed in their quantity distribution or shape depending on the optical properties of the diffuser sheet 24.

In the above embodiment, the diffusing fine particles are contained in the sheet substrate 25. However, it should not be construed restrictively. It is also possible to apply curable resin containing diffusing fine particles to the discharge surface 25a of the sheet substrate 25. Alternatively, it is also possible to apply no diffusing fine particles if the micro lenses 26 ensure sufficient optical properties.

In the above embodiment, the lens forming material F is composed of ultraviolet curable resin. However, it should not be construed restrictively. For example, the lens forming material F is composed of polyamic acid, polyimide precursor such as long chain alkyl ester of polyamic acid, or the like. In this case, note that the liquid droplets D are preferably cured as polyimide resin due to the imidization reaction by heat curing step.

In the above embodiment, the liquid droplets D are discharged by expansion/contraction movement of the piezoelectric element PZ. However, it should not be construed restrictively. For example, it is also possible to provide a resistance heating element in the cavity 36 and discharge the liquid droplets D through the formation of forms due to the heating of the resistance heating element.

In the above embodiment, the supporting substrate is embodied as the light guide plate of the edge light type backlight. However, it should not be construed restrictively. For example, the supporting substrate may be embodied as a substrate for a diffusing plate of a direct type backlight (for example, glass substrate or polycarbonate substrate of about 5 mm thickness), and the diffuser sheet 24 may be embodied as a diffusing layer for the diffusing plate.

In the above embodiment, the optical sheet is embodied as the diffuser sheet 24 for the edge light type backlight. However, it should not be construed restrictively. For example, the optical sheet may be a diffuser sheet which is provided for the projection screen or an optical sheet which is provided for the building material such as window glass.

What is claimed is:

1. A method of manufacturing an optical sheet, comprising:
    discharging a liquid droplet to one side surface of a sheet substrate; and
    curing the liquid droplet so that a protrusion is formed in the one side surface to allow light from the one side surface to be refracted and emitted,
    wherein a supporting substrate that supports the sheet substrate is adhered to another side surface of the sheet substrate before the liquid droplet is discharged; and
    wherein the sheet substrate includes a plurality of diffusing fine particles that allow the light entering from the another side surface side of the sheet substrate to be diffused on the one side surface side, the diffusing fine particles being entirely embedded in the sheet substrate.

2. The method of manufacturing an optical sheet according to claim 1, wherein the another side surface of the sheet substrate is opposed to the one side surface.

3. The method of manufacturing an optical sheet according to claim 1, wherein
    the supporting substrate is a light guide plate that allows light from a light source to be guided from an emission surface of the supporting substrate toward the another side surface of the sheet substrate opposed to the one side surface; and
    the emission surface of the light guide plate is adhered to the another side surface of the sheet substrate before the liquid droplet is discharged.

4. The method of manufacturing an optical sheet according to claim 1, wherein liquid repellency is applied to the one side surface so as to repel the liquid droplet before the liquid droplet is discharged.

5. The method of manufacturing an optical sheet according to claim 1, wherein the protrusion is different in refractive index from the 'sheet substrate.

6. The method of manufacturing an optical sheet according to claim 1, wherein the protrusion is a micro lens that allows the light from the one side surface to be diffused.

7. The method of manufacturing an optical sheet according to claim 1, wherein the sheet substrate includes a diffusing fine particle that allows the light entering from the another side surface side of the sheet -substrate to be diffused on the one side surface side.

8. An optical sheet manufactured by the method of manufacturing an optical sheet according to claim 1.

9. A planar lighting apparatus, comprising: a light source; and
    an optical sheet that refracts and emits light introduced from the light source, wherein
the optical sheet is the optical sheet according to claim 1.

10. An electro optical apparatus that modulates and emits light from a planar lighting apparatus, wherein the planar lighting apparatus is the planar lighting apparatus according to claim 9.

\* \* \* \* \*